United States Patent [19]

Knowd

[11] Patent Number: 4,706,293

[45] Date of Patent: Nov. 10, 1987

[54] CIRCUITRY FOR CHARACTERIZING SPEECH FOR TAMPER PROTECTED RECORDING

[75] Inventor: Michael J. Knowd, Vadnais Heights, Minn.

[73] Assignee: Minnesota Mining and Manufacturing Company, St. Paul, Minn.

[21] Appl. No.: 639,787

[22] Filed: Aug. 10, 1984

[51] Int. Cl.$^4$ .............................................. G10L 5/00
[52] U.S. Cl. ........................................ 381/31; 360/27
[58] Field of Search ............... 360/27, 60, 31; 381/37, 381/43, 45, 49, 50

[56] References Cited

U.S. PATENT DOCUMENTS

| | | | |
|---|---|---|---|
| 3,546,584 | 12/1970 | Scarr | 381/49 |
| 3,548,100 | 12/1970 | Loe | 381/50 |
| 3,573,612 | 4/1971 | Scarr | 381/49 |
| 3,940,565 | 2/1976 | Lindenburg | 381/43 |
| 4,040,099 | 8/1977 | Cook | 360/60 |
| 4,086,634 | 4/1978 | Cook | 360/60 |
| 4,317,141 | 2/1982 | Onishi et al. | 360/60 |
| 4,388,495 | 6/1983 | Hitchcock | 381/43 |
| 4,477,848 | 10/1984 | McWhirter et al. | 360/60 |

Primary Examiner—E. S. Matt Kemeny
Attorney, Agent, or Firm—Donald M. Sell; James A. Smith; Robert L. Marben

[57] ABSTRACT

Circuitry usable in a tamper protected recording system for characterizing audio signals at the time of recording including a filter for selecting a portion of the audio signal, a zero crossing detector to detect zero crossings, a threshold detector to determine when the threshold of the detector is satisfied, a first microprocessor for counting the zero crossing detections for successive time intervals and determining for each of the time intervals whether the threshold was satisfied and a second microprocessor for converting the counts and threshold information into data signals that can be recorded with the audio signal.

11 Claims, 1 Drawing Figure

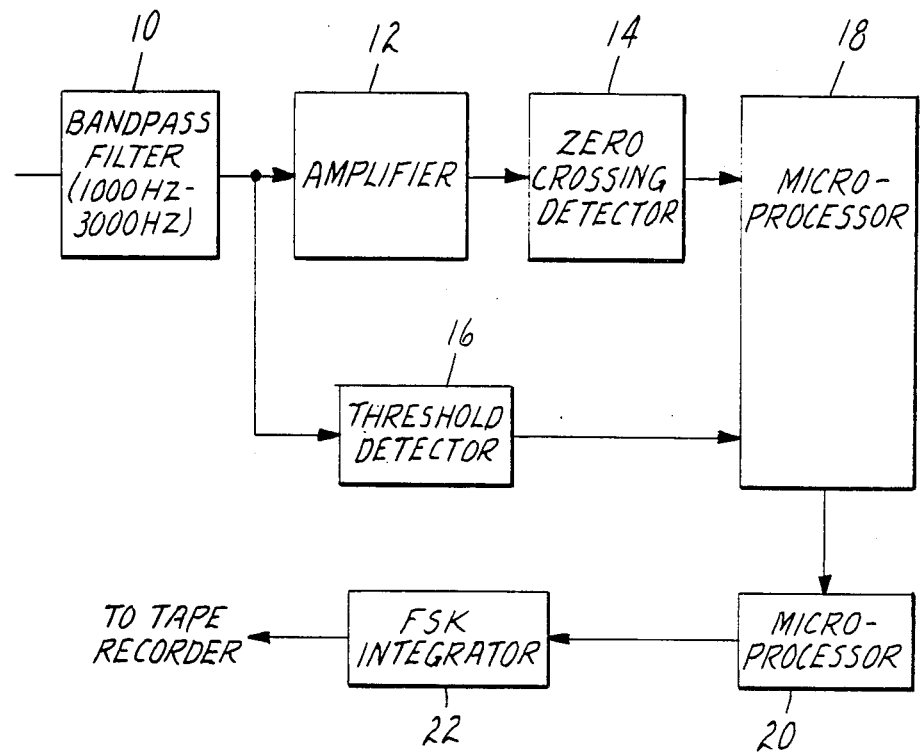

4,706,293

CIRCUITRY FOR CHARACTERIZING SPEECH FOR TAMPER PROTECTED RECORDING

BACKGROUND OF THE INVENTION

1. Field of the Invention

This invention relates to circuitry for characterizing audio signals at the time they are being recorded on a recording medium for later reproduction. Data signals obtained from the characterizing information are also recorded on the recording medium which are usable at a later time to determine whether the recorded audio has been altered. In particular, the invention relates to such audio characterizing circuitry wherein the audio is characterized by the use of zero crossing detection circuitry.

There are situations where it is desirable to make a recording of audio information, such as speech or speech plus other audio, which will be played back at a later time with such recording made in a manner such that the authenticity of the recording, if questioned, can be verified electronically using a reasonable amount of electronic circuitry. Recordings made in such a manner have application in fields such as law enforcement, private investigation, journalism, medical, legal and many other similar fields where the authenticity of audio recordings might be questioned at some time.

2. Description of the Prior Art

A tamper protected recording system has been disclosed wherein input audio signals are recorded together with a first data signal that includes characterizing information derived from the input audio signals with a second data signal produced during playback that includes information of the same type obtained from input audio signals, with such second data signal derived from the recorded input audio signals. The two data signals are compared electronically. If the two data signals fail to provide a high level of comparison, the recording is considered to have been altered.

The level of comparison that can be attained with such a system using a reasonable amount of circuitry is directly related to the information contained in the input audio signals that is used to provide the data signal and the manner in which such information is obtained. Use of the envelope information presented by the input audio signal for characterizing information, for example, is not desirable since it does not contain sufficient information to permit the attainment of a desired level of comparison of the two data signals by the use of a reasonable amount of circuitry to provide an economically acceptable system.

SUMMARY OF THE INVENTION

The present invention is embodied in circuitry usable for providing the characterizing information to be obtained from the audio signal input for a system of the type described. The circuitry provides zero crossing information contained in the input audio signals for inclusion in data signals recorded with the input audio signal. The circuitry functions to count the zero crossing in a limited bandwidth of the audio input signal. Such counts are taken during equal and sequential increments of time. The time increment used is much less than the time it takes to say most words. The circuitry can provide for amplification of the audio input, if necessary, to ensure that the level of any noise signals that are present, when audio is not present, is sufficient so the zero crossings of the noise signals within the bandwidth will be counted. While not required in all cases, it is preferred that the zero crossing detector have some hysteresis to prevent the zero crossing detector circuit from chattering due to noise in the audio input signal and thus provide accurate zero crossing detections. The audio input signal within the limited bandwidth is examined by the circuitry to determine whether a threshold has been satisfied. By using the threshold requirement, the zero crossing count taken when the threshold has been satisfied any time during a counting time increment is usable even should there be dropouts in the recorded signal that are as much as the threshold level. Whether the threshold requirement has been satisfied is easily indicated in the data signal since only one bit of data is required. The count obtained for each counting time increment is entered as a part of the data signal and is followed by one bit which indicates whether the threshold was satisfied at least once during the counting time increment. In a similar manner, circuitry used subsequent to the recording of the audio input signals and data signal to provide a verification of the recording's authenticity provides for a count of zero crossings of the recorded audio input for a second data signal. The counts contained in the two data signals are compared when the data signal recorded with the recorded audio indicates the count per recorded data signal was made when the threshold requirement was satisfied. It has been found that the difference in the counts when the recorded audio signal has been altered is significantly larger than the difference presented when there has been no alteration of the recorded audio signal so the occurrence of any alteration in the recorded audio signal is readily identified.

Circuitry embodying the invention includes a bandpass filter for passage of a portion of the audio signal that is being recorded. If needed, the filter output can be amplified to provide a signal level that is sufficient so all zero crossings of the audio and any noise signals can be counted. A zero crossing detector receives the filtered audio signal with the detector output provided to a counter that is available in the first of two microprocessors which is programmed to provide a count of the zero crossing present during each of the sequential counting time intervals of a predetermined length. The circuitry also includes a threshold detector which is connected to receive the output of the bandpass filter and has its output connected to the first microprocessor. The threshold of the threshold detector is set at a level sufficient to prevent most recording dropouts from interfering with the zero crossing count of the audio signal. A zero crossing count obtained for a counting time interval is considered valid if the threshold is satisfied at least once during such counting interval. The second microprocessor receives count and threshold information for each of the counting time intervals from the first microprocessor and generates frequency shift keying (FSK) signals. A signal of one frequency is provided for a binary 1 and another frequency for a binary 0 and are produced in accordance with the counts received from the first microprocessor and whether threshold was satisfied for such counts. The FSK signals for counts and whether the threshold was satisfied are recorded as a part of the data signal recorded with the audio signal.

In one embodiment, the first microprocessor is programmed to compress the count for each counting time interval so that a count can be recorded using fewer bits. Such compression is possible since a minimum number of zero crossings will occur during each count time interval due to the range of signals passed by the bandpass filter, so only the count in excess of such minimum number need be recorded as a part of the data signal on the tape.

BRIEF DESCRIPTION OF THE DRAWING

The novel features and advantages of the invention presented herein will become more apparent to those skilled in the art upon consideration of the following detailed description and referenced drawing which is a single FIGURE that is a schematic drawing in block form of circuitry embodying the invention.

DETAILED DESCRIPTION

The tamper protecting recording system for which the invention presented herein has application provides for the recording of an audio input together with a data signal containing information on a recording media, such as magnetic recording tape, which is useful for determining whether the recorded audio input has been altered subsequent to its recording. It is possible to record the audio and data signal on the same track or use separate tracks. If the recording is made at a slow speed, the use of a separate track is preferred due to the limited frequency separation that is possible at the low recording speeds. In a known tamper protecting recording system the data signal includes periodic recording of the identification number provided for the recorder, real time and characterizing information from the audio signal based on a count of zero crossings for use in the data signal recorded with the audio input that is being recorded. Referring to the single FIGURE of the drawing, circuitry embodying the present invention includes a bandpass filter 10, an amplifier 12, a zero crossing detector 14, a threshold detector 16, two microprocessors 18 and 20 plus an FSK integrator 22.

Speech, while having a low dominate frequency, does not contain much characterizing information at such frequency. Another factor that must be considered is the frequency bandwidth of the tape recording system provided for the recording speed being used. The higher the recording speed, the greater the bandwidth provided by the recorder. In order that a compact recorder can be employed and still provide adequate recording time, a low recording speed is used. The circuit of the drawing, with respect to the bandwidth of the filter 10, is based on the foregoing factors wherein the recording speed is 1.2 cm/sec. The bandpass selected for filter 10 is 1,000 to 3,000 Hertz and is connected to receive the same audio signal that is being recorded by the tape recorder (not shown). The output of the filter 10 is applied to the amplifier 12. A bounded or clipped amplifier is preferred for use as the amplifier 12 since it provides an amplifier that will not go into saturation and will use less current which is important for a battery operated recorder with which the circuit of the drawing is included. The amplifier 12 is used to provide a gain that is sufficient to assure that low level noise signals present in the filtered signal, when there is an absence of speech, will be of a level sufficient to satisfy the hysteresis presented by the zero crossing detector 14 to which the output of the amplifier is connected. The amplifier 12 is, of course, not needed if the signal level from the filter 10 is adequate. While not required in all cases, it is preferred that some hysteresis be presented by the zero crossing detector 14 so it will not chatter due to noise in the speech signal. The speech signals are normally much greater than any background noise. The zero crossing detections made by the zero crossing detector 14 are counted by a binary counter. This can be provided by the microprocessor 18, which is available, eliminating the need for a separate counter circuit. The microprocessor 18 will be available since it is needed for other functions relating to the overall system in which the present invention is usable. The counts taken by the microprocessor 18 of the zero crossings are obtained during equal and sequential increments of time wherein such time increment is much less than the time it takes to say most words. A time interval of 15.625 milliseconds is suitable providing 64 counting intervals every second. This time interval coupled with the bandpass filter means the count will range from about sixteen to forty-eight allowing the count to be compressed by using only the count above sixteen as data to be recorded with the audio signal. With the count so compressed, only five data bits are required for each count which makes for efficient use of data bit density. These counts, as provided by the microprocessor 18, are fed to a microprocessor 20 which serves to convert the count to frequency shift keying (FSK) form for recording of the count on the tape or other recording media of the recorder (not shown) as frequency signals wherein one cycle of one frequency represents a "1" and another frequency, for example, a frequency twice that of the one frequency, is used to provide two cycles to represent a "0". To simplify the maintenance of the necessary timing that is required, such frequencies have a harmonic relationship with the frequency of the clock of the microprocessor 18 which determines the time interval used for taking the zero crossing count. Frequencies of 1024 and 2048 Hertz are used for "1" and "0", respectively, and are derived from the clock provided by microprocessor 20. The microprocessor 20 also used to time the entry of other information for the data signals mentioned earlier in such FSK form for recording with the count information and also provide necessary synchronizing bits, bits for an error correction code as well as fill bits. The FSK signal output of the microprocessor 20 is shaped via the FSK integrator circuit 22 before it is presented to the recorder (not shown) for recording with the audio input provided to the recorder. Real time has been indicated as one of the inputs to be provided as a part of the data signal to be recorded. The real time information is maintained by the microprocessor 18 which uses a 32,768 Hertz clock crystal as the basis of its timing. This allows the microprocessor 20 with its 1.048576 megahertz clock to be turned off to conserve power when the system is not being used for recording audio input and data signals.

It was found that the circuitry that has been described in detail to this point is not suitable for supplying zero crossing counts as a part of the data signal which is recorded. When such circuitry to provide the zero crossing counts was used, comparisons of the recorded zero crossing counts with zero crossing counts obtained from the recorded audio input by a similar circuit in a decoder provided for checking the recording for possible alteration provided erratic results. Though no alteration had been made, the results could be those expected if the recorded audio input had been altered. A study of the results obtained led to the discovery that the differences presented by the comparisons would be consistent if the comparison was made only if a threshold requirement was met by the audio being recorded and being characterized by zero crossing count over a counting time interval. The threshold detector 16 was added to the circuitry described to this point and receives its input from the filter 10. The threshold detector 16 provides an indication to the microprocessor 18 as to whether the audio signal received from the filter 10 has satisfied the threshold level of the detector 16. A suitable threshold level for the detector 16 is one that will be satisfied 50 to 70 percent of the time while speech is presented for recording. In the case of a detector 16 having hysteresis, a threshold on the order of twenty decibels above the hysteresis of the zero crossing detector was found to be suitable. The microprocessor 18 is programmed to provide one bit of information to the microprocessor 20 for each counting time interval to indicate whether the threshold was satisfied at any time during the counting time interval. A "1" can be used to indicate the threshold was satisfied and a "0" used to indicate the threshold was not satisfied or vise versa. This information bit is passed to the microprocessor 20 and is put in FSK data for recording. It is convenient to have this information bit follow the bits used to convey the zero crossing count made for a count time interval.

By using the threshold detector 16 to establish a criteria with respect to the reliability of the count made of the zero crossings during the count time interval, it is possible to make a count of zero crossings upon play back of the recorded audio signal to provide a reliable comparison with the zero crossing counts recorded via the data signal at the time the audio signal is recorded to determine whether any tampering of the recorded audio signal has occurred. The zero crossing count of the recorded audio signal is made using circuitry similar to the single FIGURE of the drawing but without a threshold detector 16. A comparison of the zero crossings counts shows a total maximum difference of about forty-eight crossings over sixteen consecutive counting intervals when there has been no alterations made to the recorded audio signal. A difference is considered only when the threshold information bit indicates the threshold of detector 16 was satisfied for that counting interval. The presence of any tampering in a sixteen consecutive counting interval causes the difference count for the sixteen count intervals to increase dramatically to a level of about one hundred or more. Based on the foregoing, the audio of a recording that is made in the manner that has been described will be considered to have been tampered subsequent to its recording if the difference between the zero crossing count obtained for sixteen consecutive counting intervals made at the time the audio signal is recorded and the count obtained from a playback of the audio is greater than forty-five.

Once a solution had been found to the problem of obtaining usable zero crossing counts, further analysis was made to determine why erratic results were obtained when using counts made with a circuit not having the threshold detector 16. It is believed one important factor is the dropouts which occur during recording and playback of the audio. Another error source is considered to be noise signals of a low level that are recorded which are not faithfully reproduced upon playback. From a functional aspect, the threshold level used for detector 16 is one that serves to prevent most recording dropouts from interfering with the zero crossing characterization of the audio signal.

While the invention has been described in connection with an exemplary embodiment thereof, it will be understood that many modifications thereof will be readily apparent to those of ordinary skill in the art; and that this specification is intended to cover any adaptations or variations thereof. Therefore, it is manifestly intended that this invention be only limited by the claims and the equivalents thereof.

What is claimed is:

1. Circuitry for the production of characterizing information with respect to an audio signal being recorded on a recording media including:
    filter means operatively connected for receiving the audio signal and selecting a portion of the audio signal;
    a zero crossing detector operatively connected to the output of said filter means for detecting the zero crossings of the audio signal received from said filter means;
    a threshold detector connected to the output of said filter for determining when the signal from said filter satisfies the threshold of said threshold detector;
    means connected to the output of said threshold detector and said zero crossing detector for producing a count of the zero crossing for consecutive time intervals, as characterizing information, and providing an indication of whether the threshold of said threshold detector was satisfied during each of said consecutive time intervals; and
    means connected to said means connected to the output of said threshold circuit and said zero crossing detector for receiving said count for each of the consecutive time intervals and said indication for each of the consecutive time intervals and converting said counts and indications into data signals which can be recorded with the audio signal on the recording media.

2. Circuitry according to claim 1 further including an amplifier connected between the output of said filter means and the input of said zero crossing detector, said zero crossing detector having hysteresis and said amplifier having a gain so low level noise signals from said filter means, when there is an absence of audio signals to be recorded, have a level at the input of said zero crossing detector which satisfy the hysteresis presented by said zero crossing detector.

3. Circuitry according to claim 1 wherein the threshold of said threshold detector is of a level such that the threshold is satisfied at least fifty percent of the time that a speech input is presented as the audio signal being recorded.

4. Circuitry according to claim 1, wherein said count is a compressed count.

5. Circuitry according to claim 1 wherein said means connected to the output of said threshold detector and said zero crossing detector is provided by a microprocessor.

6. Circuitry according to claim 1 wherein said means connected to said means connected to the output of said threshold detector and said zero crossing detector is provided by a microprocessor.

7. Circuitry according to claim 1 wherein said converting of said counts and indication into data signals involves frequency shift keying.

8. Circuitry according to claim 1 wherein the threshold of said threshold detector is of a level sufficient to prevent most recording dropouts from interfering with the zero crossing characterization of the audio signal.

9. Circuitry according to claim 1 wherein the threshold of said threshold detector is about 20 decibels above the hysteresis of said zero crossing detector.

10. Circuitry according to claim 1 wherein said filter is a bandpass filter.

11. Circuitry according to claim 1 wherein said time intervals are equal and of a duration that is less than one second.

* * * * *